May 19, 1931.    W. S. CARMODY    1,805,653
LIFTING AND TRANSFERRING DEVICE
Filed Oct. 15, 1929    3 Sheets-Sheet 1

May 19, 1931.   W. S. CARMODY   1,805,653
LIFTING AND TRANSFERRING DEVICE
Filed Oct. 15, 1929   3 Sheets-Sheet 3

WITNESSES
O.H.Cook
Evelyn Crompton

INVENTOR
William S. Carmody
BY
Joshua R.H.Potts
ATTORNEY

Patented May 19, 1931

1,805,653

UNITED STATES PATENT OFFICE

WILLIAM S. CARMODY, OF SALEM, NEW JERSEY

LIFTING AND TRANSFERRING DEVICE

Application filed October 15, 1929. Serial No. 399,827.

This invention relates to lifting and transferring devices, and particularly to devices of that character which are mounted on traction means whereby they may be conveyed from place to place.

One of the objects of the invention is to provide a new and improved lifting and transferring device.

Another object is to provide a device of the kind mentioned, which has a boom and which, when the load is lifted from the ground, has its tackle so arranged that the boom will swing and transfer the load.

According to the invention the device is mounted on a bed or truck provided with traction wheels and has a mast supported thereon, a boom swingably attached to the mast, the usual block, and tackle so arranged that when the load is raised from position, the boom will swing to the desired location.

The drawings illustrate an embodiment of the invention and the views therein are as follows.

Figure 1:
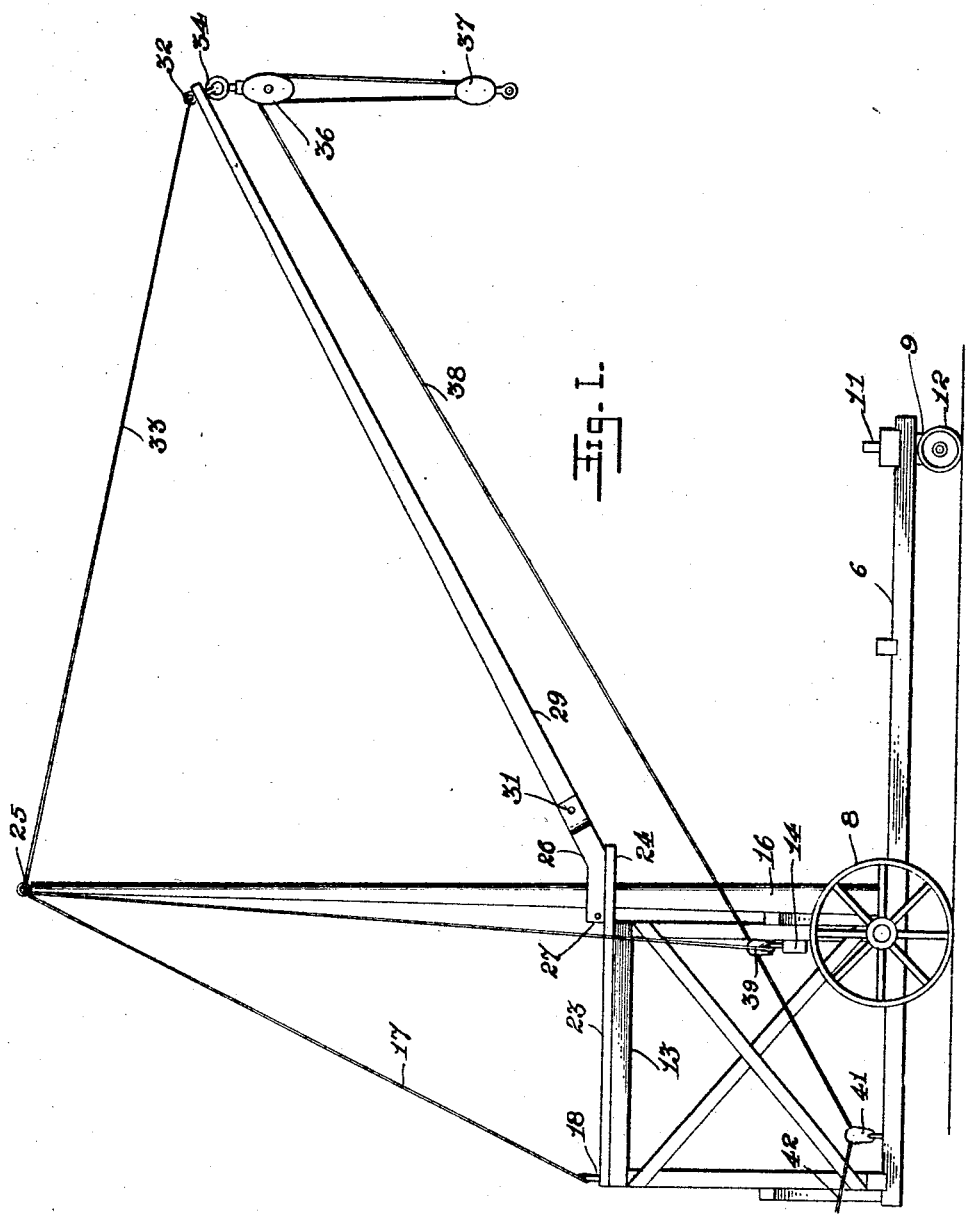
Figure 1 is a side elevation showing the boom in position for receiving a load.

The bed or truck 6 is provided at a point intermediate its ends with an axle 7 which is fastened to the truck in any convenient manner, and this axle is provided without the truck sides with large wheels 8.

The front of the truck is provided with a carriage 9 which is pivotally supported at 11 in the truck structure 6 and has the wheels 12 for cooperating with the wheels 8 in the movement of the device.

Between the axle 7 and the rear of the truck there is provided upstanding frame work 13 and associated therewith is a cross bar 14.

Immediately in front of the frame work and securely fixed upon the truck is a mast 16 which has a rear guy wire 17 fastened to the eye bolt or screw 18 at the rear of the frame work, and guy wires 19 and 20 fastened to suitable eye bolts or screws 21 and 22 near the outer ends of the cross bar 14.

The other ends of each of these guy wires 17, 19 and 20 are fastened in the eye bolt 25 at the top of the mast so as to provide the proper rigidity for the mast and to assist in holding the same in vertical position at all times, regardless of the load on the boom hereinafter referred to.

The frame work 13 has a platform 23 with a forwardly extending end 24, the latter fitting around the mast 16.

Figure 2:
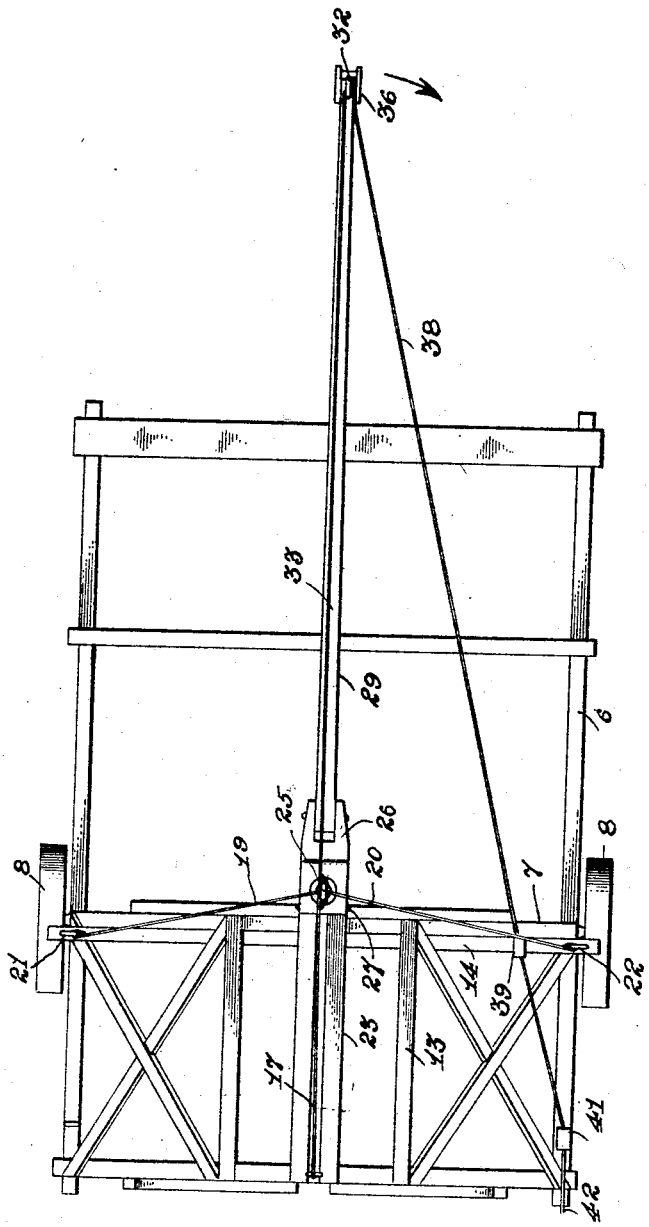
Figure 2 is a top plan view of the same.
Figure 3:
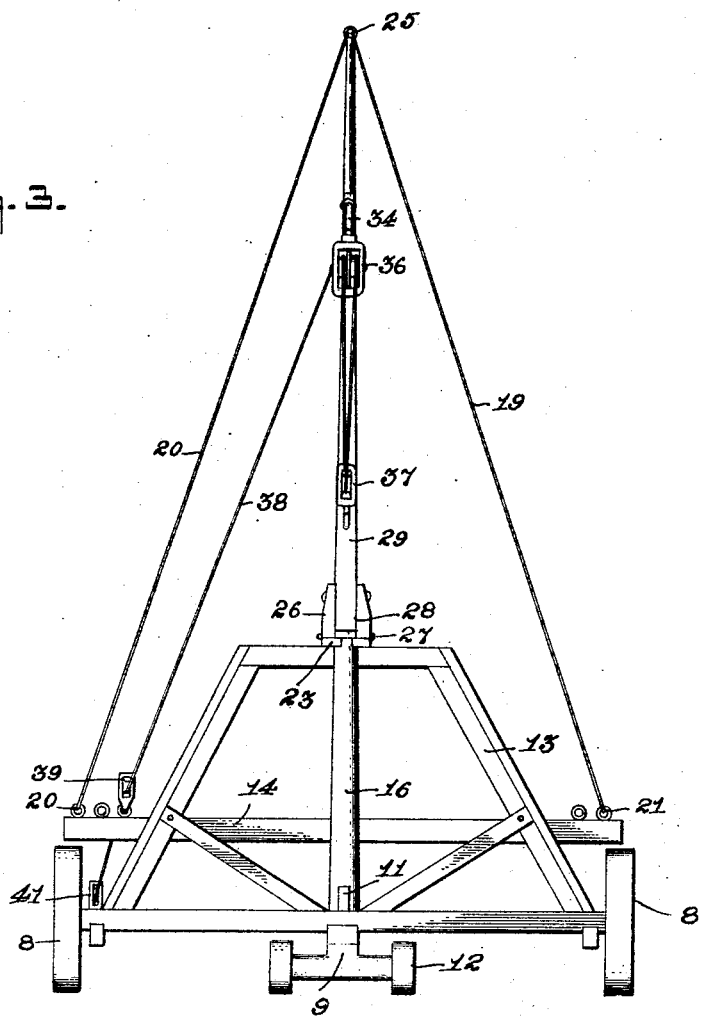
Figure 3 is a front end view.

Resting upon the inner end of the platform 23 and on the portion 24 is a brace 26 which is formed of two half sections, as shown in Figures 2 and 3, and these sections are connected together by bolts 27 so as to properly embrace the mast 16 and still permit rotary movement of the same thereon, while the inwardly extending parts of said brace members, when so connected, provide a recess 28 into which the lower end of the boom 29 is pivoted at 31.

In the present drawings I have shown the boom as provided at its upper outer end with an eye bolt 32 providing means for securing a guy wire 33, and whose other end is fastened to the eye bolt 25 on the upper end of the mast.

The under outer end of the boom is provided with the usual ring 34 to which is attached the block 36.

The tackle carries a pulley 37 and the connections between the block and pulley are of the conventional type, and after passing through the block the rope or cable 38 of the tackle extends back obliquely and to a sheave 39 located near one end of the cross bar 14 and from thence to another sheave 41 fastened on the outer side of the frame work 13.

This rope or cable 38 extends outward, as at 42, to any convenient source of power.

It will be understood, of course, that to the ring of the pulley 37 there is attached a hook, grapple irons, or other tool, and when tension is placed on the rope 38, it will raise the pulley 37 and by reason of the location of the sheave 39, the boom will immediately, upon the lifting of the load from its place of support, swing in the direction of the arrow shown in Figure 2.

Of course, in the present instance, the guy wire 33 has been shown as of fixed length, thereby supporting the block at a fixed height, but as the inner end of the boom is pivoted at 31, the guy wire 33 may be shortened or lengthened to raise or lower the block as desired.

The invention fills a long felt want among farmers for use in the field, for loading wagons with bundles of straw, etc., and will have numerous uses in connection with other trades.

Of course, the lifting and tranferring device illustrated may be modified and changed in various ways without departing from the invention herein set forth and hereafter claimed.

I claim:—

1. A derrick comprising a wheeled base, a frame erected upon the base, a platform upon and extending beyond the frame over the base and having an opening in its extended end, a mast projected downwardly through said opening and stepped on the base, a collar encircling the mast and bearing upon the platform, a boom pivoted to said collar, detachable means to maintain the verticality of the mast, and tackle carried in part at the end of the boom.

2. A derrick comprising a wheeled base, a frame erected upon the base, a platform upon and extending beyond the frame over the base and having an opening in its extended end, a mast projected downwardly through said opening and stepped on the base, a collar encircling the mast and bearing upon the platform, a boom pivoted to said collar, detachable means to maintain the verticality of the mast, and tackle carried in part at the end of the boom and extending therefrom directly to a sheave adjacent the side of the base tending to impart lateral swinging movement to the boom when the tackle is tautened.

In testimony whereof I have signed my name to this specification.

WILLIAM S. CARMODY.